(12) United States Patent
Lee

(10) Patent No.: US 8,739,534 B2
(45) Date of Patent: Jun. 3, 2014

(54) SOLAR-BASED POWER GENERATOR

(76) Inventor: John Lee, Germantown, MD (US)

( * ) Notice: Subject to any disclaimer, the term of this patent is extended or adjusted under 35 U.S.C. 154(b) by 595 days.

(21) Appl. No.: 12/659,806

(22) Filed: Mar. 22, 2010

(65) Prior Publication Data

US 2010/0244449 A1    Sep. 30, 2010

Related U.S. Application Data

(63) Continuation-in-part of application No. 12/452,273, filed as application No. PCT/US2009/001866 on Mar. 25, 2009.

(51) Int. Cl.
| | |
|---|---|
| *F03G 6/00* | (2006.01) |
| *F03G 7/00* | (2006.01) |
| *F01K 23/06* | (2006.01) |
| *F24J 2/38* | (2006.01) |
| *F24J 2/42* | (2006.01) |
| *F24J 2/08* | (2006.01) |

(52) U.S. Cl.
USPC .......... 60/641.15; 60/670; 126/600; 126/604; 126/609; 126/699; 126/700

(58) Field of Classification Search
USPC ................ 60/641.8, 641.9, 641.11, 641.15; 126/573–582, 600–608, 609–616, 126/698–700, 704–713
See application file for complete search history.

(56) References Cited

U.S. PATENT DOCUMENTS

| | | | |
|---|---|---|---|
| 1,302,363 A * | 4/1919 | Graham .......................... | 122/26 |
| 1,993,213 A | 3/1935 | Gill | |
| 3,459,953 A * | 8/1969 | Brauser et al. .................... | 290/2 |
| 3,567,952 A | 3/1971 | Doland | |
| 3,628,332 A | 12/1971 | Kelmar | |
| 3,871,180 A | 3/1975 | Swanson | |
| 4,068,474 A * | 1/1978 | Dimitroff .................... | 60/641.15 |
| 4,116,223 A * | 9/1978 | Vasilantone .................. | 126/643 |
| 4,148,300 A * | 4/1979 | Kaufman, Sr. ................ | 126/684 |
| 4,213,303 A * | 7/1980 | Lane .......................... | 60/641.15 |
| 4,258,698 A * | 3/1981 | Sales ............................. | 126/700 |
| 4,341,204 A | 7/1982 | Bloxsom | |
| 4,391,100 A * | 7/1983 | Smith ......................... | 60/641.11 |
| 4,398,391 A | 8/1983 | English, Jr. | |
| 4,759,300 A | 7/1988 | Hansen et al. | |
| 4,942,734 A | 7/1990 | Markbreiter et al. | |
| 5,191,875 A | 3/1993 | Edling et al. | |
| 5,404,868 A * | 4/1995 | Sankrithi ....................... | 126/604 |
| 6,062,029 A * | 5/2000 | Doe ........................... | 60/641.15 |
| 6,123,067 A | 9/2000 | Warrick | |
| 6,523,348 B1 | 2/2003 | Acharya et al. | |
| 6,601,543 B2 | 8/2003 | Rautenbach et al. | |
| 6,647,725 B1 | 11/2003 | Letovsky | |
| 6,651,435 B1 | 11/2003 | Johnston | |

(Continued)

*Primary Examiner* — Christopher Jetton
(74) *Attorney, Agent, or Firm* — Richard C. Litman

(57) ABSTRACT

The solar-based power generator is a system for producing usable electricity from water, which is heated through concentration of ambient, environmental light. The generator includes a reservoir having an open upper end. The reservoir receives a volume of water therein. A convex lens is mounted on an upper edge of the reservoir. The convex lens covers the open upper end. A steam output port is in fluid communication with a steam-based electrical generator. The convex lens concentrates ambient light on the water stored within the reservoir, thus heating the water and to converting the liquid water to steam. Additionally, a methane-burning electrical generator is in communication with the reservoir. Pollutants in the water produce methane during heating and decomposition, which is burned by the methane-burning electrical generator.

5 Claims, 3 Drawing Sheets

(56) References Cited

U.S. PATENT DOCUMENTS

| | | | |
|---|---|---|---|
| 6,870,681 B1 * | 3/2005 | Magee | 359/626 |
| 7,168,252 B1 | 1/2007 | Price | |
| 7,185,493 B1 | 3/2007 | Connelly | |
| 7,299,632 B2 | 11/2007 | Laing et al. | |
| 2006/0010867 A1 | 1/2006 | Shaw | |
| 2006/0109558 A1 | 5/2006 | Nishioka | |
| 2007/0058256 A1 | 3/2007 | Sun | |
| 2007/0157614 A1 | 7/2007 | Goldman | |
| 2007/0209364 A1 | 9/2007 | Aggarwal | |
| 2007/0245730 A1 | 10/2007 | Mok | |
| 2008/0285152 A1 | 11/2008 | Suzuki et al. | |

* cited by examiner

SOLAR-BASED POWER GENERATOR

CROSS-REFERENCE TO RELATED APPLICATION

This application is a continuation-in-part of U.S. patent application Ser. No. 12/452,273, filed Dec. 23, 2009, which is an entry into the U.S. national phase from PCT Patent Application Serial No. PCT/US2009/001866, filed Mar. 25, 2009.

BACKGROUND OF THE INVENTION

1. Field of the Invention

The present invention relates to power generation, and more particularly to a solar-based power generator that uses a magnifying glass to concentrate ambient light on a volume of water or sewage to produce steam and/or methane gas, which then powers a steam generator and/or a methane burner to produce usable electricity.

2. Description of the Related Art

The availability of unlimited solar energy, in the form of solar radiation and heat, is an attractive source of energy for a wide variety of reasons, and for many diverse purposes. Many applications for harnessing or using solar radiation to generate electricity, or a useful mechanical output, are known. For example, silicon solar cells, which respond to light from the sun, are used to generate electricity, which then may be used directly or stored by charging a battery. Typically, solar cells generate only small amounts of electricity, so that solar cell systems generally are used only to operate electronic devices requiring relatively low power levels, such as portable calculators and the like.

Solar cell arrays many square feet in size have been used to power direct current motors to operate larger equipment, such as pool pumps and the like. Typically, however, solar cell arrays need to be extremely large in order to produce any substantial quantity of electricity. As a result, such solar cell arrays have not been found to be a practical source for utilizing energy from the sun, except in a few very specialized cases. Additionally, solar cells must be very carefully manufactured, using complex and costly processes, some of which are harmful, due to byproducts, to the environment.

It would be desirable to provide an electrical generator which relies on solar energy, but which is also efficient in energy production, and which his further environmentally friendly. Thus, a solar-based power generator solving the aforementioned problems is desired.

SUMMARY OF THE INVENTION

The solar-based power generator is a system for producing usable electricity from water, which is heated through concentration of ambient, environmental light. The solar-based power generator includes a reservoir having a base, at least one sidewall and an open upper end. The reservoir is dimensioned and configured for receiving a volume of water therein. A water input port is formed through the at least one sidewall, and water may be input using any suitable type of water pump or the like. The water may be from any source, including seawater, polluted or contaminated water, sewage or the like.

A convex lens is mounted on an upper edge of the at least one sidewall of the reservoir. The convex lens covers the open upper end of the reservoir. The convex lens includes upper and lower surfaces, which are preferably both convex, i.e., the lens is a double convex or converging lens, and preferably each surface has a constant radius of curvature.

Further, a steam output port is formed through the at least one sidewall, preferably above a fixed water line within the reservoir. A steam-based electrical generator is in communication with the interior of the reservoir, through the steam output port. The convex lens concentrates ambient light on the volume of water stored within the reservoir, thus heating the water and converting the water to steam. The steam generator generates usable electricity, which may then be drawn off to be used by external devices.

Additionally, a methane output port is preferably also formed through the at least one sidewall, also preferably above the fixed water line within the reservoir. A methane-burning electrical generator is in communication with the interior of the reservoir, through the methane output port. Pollutants in the water or sewage produce methane gas during heating and decomposition thereof, which may then be burned by the methane-burning electrical generator for producing further usable electricity.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
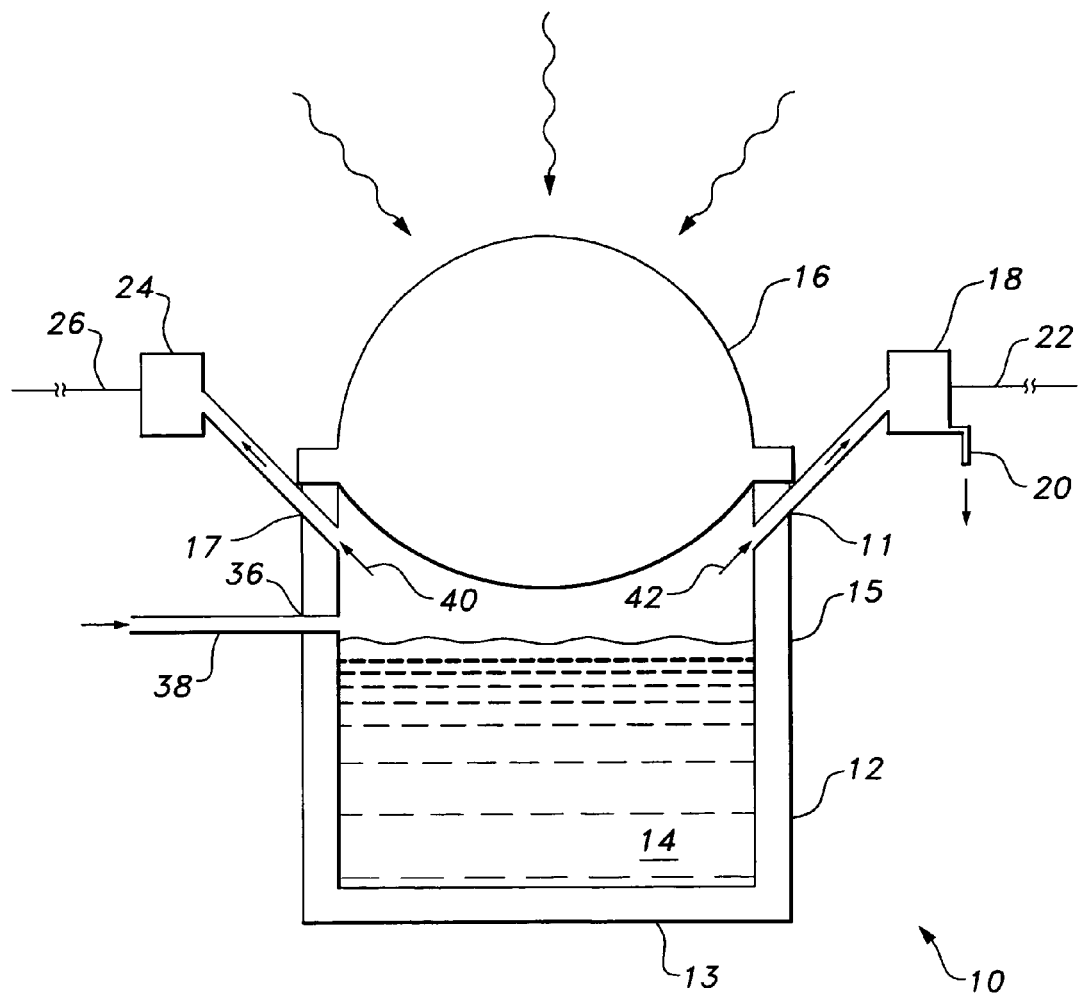
FIG. 1 is a diagrammatic view of a solar-based power generator according to the present invention.

As shown in FIG. 1, the solar-based power generator 10 provides a system for producing usable electricity from water 14, which is heated through concentration of ambient, environmental light. The solar-based power generator 10 includes a reservoir 12 having a base 13, at least one sidewall 15 and an open upper end. Reservoir 12 may be formed from any suitable non-corrosive and watertight material. The reservoir 12 is dimensioned and configured for receiving a volume of water 14 therein. A water input port 36 is formed through the at least one sidewall 15, and water 14 may be input using any suitable type of water pump or the like through an input pipe 38. The water 14 may be from any source, including seawater, polluted or contaminated water, sewage or the like. It should be understood that multiple generators 10 may be used in a large-scale power plant.

Figure 2:
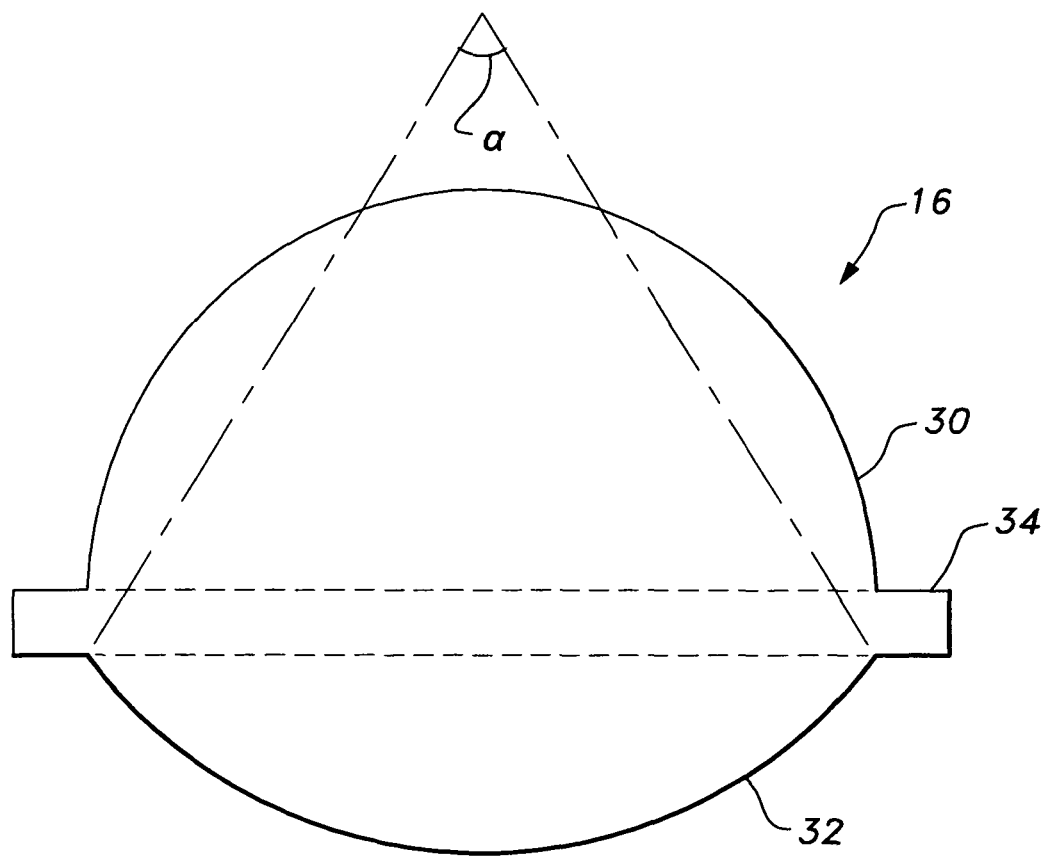
FIG. 2 is a side view of a lens for a solar-based power generator according to the present invention.

A double convex lens 16 is mounted on an upper edge of the at least one sidewall 15 of the reservoir 12. The lens 16 covers the open upper end of the reservoir 12. As best shown in FIG. 2, the lens 16 includes upper and lower surfaces 30, 32, respectively, which are both convex. Preferably, each surface 39, 32 has a constant radius of curvature. Preferably, the upper surface 30 of the convex lens spans an arc of approximately 180° and the lower surface 32 spans an angle $\alpha$ in a range between approximately 30° and 45°. The relatively wide arc of upper surface 30 allows for reception of ambient light over a wide range, thus making generator 10 usable at any time during the day, with the sun in any position.

As shown, the upper and lower portions of lens 16 may be separated by a substantially rectangular (in side cross-section) central portion 34, with the outer rim of central portion 34 providing a surface which rests on the upper edge of the at least one sidewall 15. The rim of central portion 34 is preferably secured in a fluid-tight fashion to the upper edge, so that steam or methane produced in the reservoir 12 does not escape around the lens 16. Lens 16 may be formed from any suitable type of material, such as transparent and colorless glass, and is dimensioned and configured to cover the upper edge of reservoir 12. It should be understood that any suitable type of lens, or a plurality of lenses, may be utilized, depending upon the particular power production needs of the user. The lens 16 or other external lenses may further be used to pre-heat the water 14 before input into reservoir 12. Alternatively, any other suitable type of water heater may be used for this purpose.

Further, a steam output port 11 is formed through the at least one sidewall 15, preferably above a set water line within the reservoir 12. A steam-based electrical generator 18 is in fluid communication with the interior of the reservoir 12 via the steam output port 11. The lens 16 concentrates ambient light on the volume of water 14 stored within the reservoir 12, thus heating the liquid water 14 and converting the liquid water 14 to steam (indicated by arrows 42). The steam generator 18 generates usable electricity, which may then be drawn off by any suitable line 22 to be used by external devices. Additionally, distilled water, produced by the used, cooled steam in generator 18, may be drawn off via a tap 20, for storage as purified, potable water. Steam generator 18 may be any suitable type of steam-based electrical generator, such as a steam turbine generator or the like. Such steam-based generators are well known in the art. Examples of steam-based turbine generators are shown in U.S. Pat. No. 3,567,952, issued to Doland; U.S. Pat. No. 3,628,332, issued to Kelmar; and U.S. Pat. No. 3,871,180, issued to Swanson, each of which is herein incorporated by reference in its entirety.

Additionally, a methane output port 17 is preferably also formed through the at least one sidewall 15, also preferably above the set water line within the reservoir 12. A methane-burning electrical generator 24 is in fluid communication with the interior of the reservoir 12, via the methane output port 17, such that pollutants in the water 14 produce methane gas during heating and decomposition thereof (indicated by arrows 40), which may then be burned by the methane-burning electrical generator 24 for producing further usable electricity, which is drawn off by any suitable line 26 for storage or usage by external devices. Methane generator 24 may be any suitable type of methane-based electrical generator. Such methane-burning generators are well known in the art. Examples of methane-based generators are shown in U.S. Pat. No. 4,759,300, issued to Hansen et al.; U.S. Pat. No. 4,942,734, issued to Markbreiter et al.; U.S. Pat. No. 6,523,348, issued to Acharya et al.; and U.S. Pat. No. 6,601,543, issued to Rautenbach et al.

Following evaporation of water 14 within reservoir 12, remaining residue, such as salt from seawater, organic matter from sewage, and/or chemicals from contaminated water, may be collected and used for other purposes. In operation, the user may switch between power generation from steam and power generation from methane, depending upon the particular type of liquid contained within reservoir 12 (for example, seawater would make use of steam-based electrical generator 18, without producing methane, and raw sewage would make use of methane-burning generator 24). The user may either selectively activate the appropriate generator, or an automatic separator, for separating methane gas from steam, may be utilized.

Figure 3:
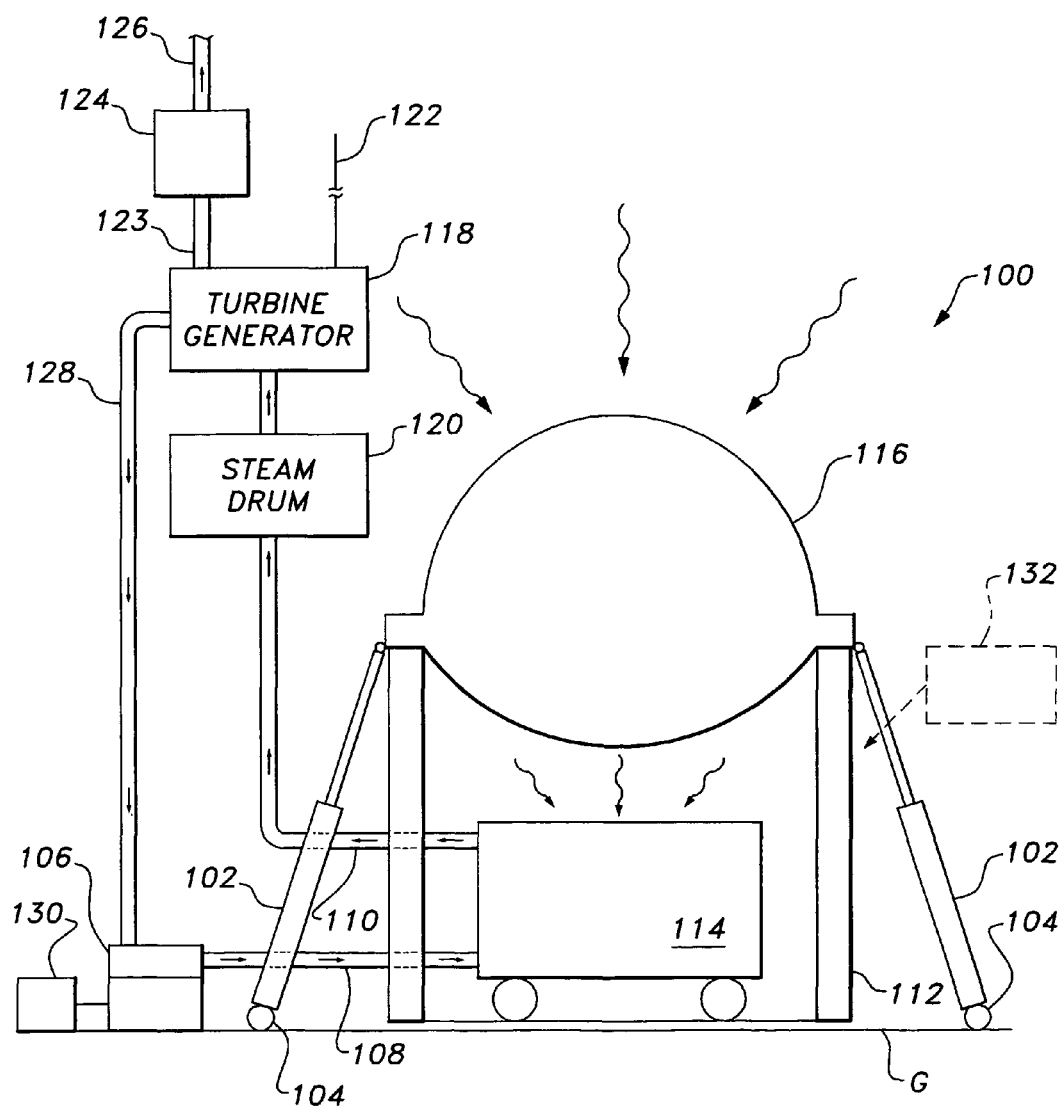
FIG. 3 is a diagrammatic view of an alternative embodiment of the solar-based power generator according to the present invention.

In the alternative embodiment of FIG. 3, system 100 utilizes a solar-energy concentrating lens 116, similar to lens 16 of FIGS. 1 and 2, however the lens 116 is mounted on a thermally insulating housing 112, rather than on the upper end of reservoir 12. It should be understood that any suitable type of focusing lens or other optical element, such as a focusing mirror arrangement, may be alternatively utilized for focusing the solar radiation. Additionally, although only a single lens is shown in FIG. 3, it should be understood that multiple optical elements may be used. It should be further understood that the curvatures of the lens may be varied, depending upon the geographic location and the particular needs of the user. The thermally insulating housing 112 is adapted for positioning on a support surface, such as the ground G, and is dimensioned and contoured to receive a mobile receptacle 114, which may contain water or any other suitable type of heat transfer fluid. As opposed to the system 10 of FIG. 1, system 100 utilizes the focused solar energy to heat only the water or heat transfer fluid, which is contained within mobile receptacle 114, allowing for easy replacement or removal of the fluid. It should be understood that FIG. 3 is diagrammatic and mobile receptacle 114 is shown for exemplary purposes only. It should be understood that thermally insulating housing 112 forms a completely thermally insulating enclosure, with the open upper end thereof being completely thermally sealed by the lens and/or any other desired seal or wall. Alternatively, depending upon the particular needs of the user, the housing 112 may have an open upper end.

Preferably, system 100 includes a solar tracking system, allowing lens 116 and housing 112 to be angularly positioned to obtain optimal exposure to solar radiation as the sun's position changes throughout the day. In FIG. 3, exemplary hydraulic cylinders 102 are shown pivotally mounted (by pivotal mounts 104) on ground G, though it should be understood that any suitable type of tracking system and complementary actuators may be utilized to position lens 116 and housing 112. Solar tracking systems are well known in the art and any suitable type of tracking system may be used. Examples of solar tracking systems are shown in U.S. Pat. No. 5,191,875, issued to Edling et al.; U.S. Pat. No. 6,123,067, issued to Warrick; and U.S. Pat. No. 7,299,632 B2, issued to Laing et al., each of which is herein incorporated by reference in its entirety.

A reservoir 106 is provided for receiving the water or heat transfer fluid, which is to be heated within mobile receptacle 114. It should be understood that the water or heat transfer fluid contained within reservoir 106 may be pre-heated. A pump 130, which may be any suitable type of pump, drives the fluid from reservoir 106, through line 108, into mobile receptacle 114 for heating by the focused solar radiation. Steam, produced by the heating, is drawn off via line 110, where it is collected and pressurized by a steam drum or steam compressor 120. The pressurized steam drives a turbine generator 118, which produces electricity. The electricity may be used to power an electrical load, or may supplement the existing electrical power grid, via electrical line 122.

Condensed water or heat transfer fluid may be drained from turbine generator 118 via line 128, which returns the liquid to reservoir 106 for reuse. Additionally, exhaust steam and/or liquid may be transferred via line 123 to an electrolysis system 124, allowing for the production of usable hydrogen gas, which may be drawn off by line 126 for collection and/or direct use. The electrolysis system 124 may be at least partially powered by the electricity generated by turbine generator 118.

When solar radiation is either unavailable, such as at night, or when it is insufficient to produce desired levels of power, a separate mobile generator 132 may be inserted within housing 112 for separately heating the fluid within mobile receptacle 114. The mobile generator 132 may be a stirling engine, a hydrogen gas burner (utilizing the hydrogen gas produced by electrolysis system 124) or any other suitable type of heater or burner, such as a methane burner, a hydrogen burner or the like, allowing for the heating of the fluid within mobile receptacle 114. In the particular case of a stirling engine, the stirling engine may be used in conjunction with the focused solar radiation, as a supplement thereto. Preferably, such an engine would be rotatable or otherwise adjustable, so as not to be damaged should the focused solar radiation become too intense. It should be understood that a non-mobile generator, burner or the like may be used, depending upon the particular needs of the user.

It is to be understood that the present invention is not limited to the embodiments described above, but encompasses any and all embodiments within the scope of the following claims.

I claim:

1. A solar-based power generator, comprising:
    a mobile receptacle adapted for receiving, containing and retaining a volume of fluid, the mobile receptacle including a bottom surface and a sidewall having a fluid input port and a steam output port, wherein the steam output port is located at a height offset from and above the fluid input port;
    a housing having an open upper end, said housing being formed from a thermally insulating material and being adapted for receiving the mobile receptacle;
    a convex lens mounted on the open upper end of said housing, above the receptacle when the receptacle is moved within the housing, the lens consists of opposed upper and lower surfaces and a peripheral rim for sealing the open upper end of the housing, the peripheral rim being in sole contact with the upper end of the housing, the lens is configured to focus solar rays directly onto the fluid;
    means for selectively delivering fluid from a source to the receptacle, wherein the fluid delivering means includes an input pipe for delivering the fluid through the fluid input port formed through the sidewall of the receptacle;
    means for generating electricity from steam, wherein the means for generating electricity is in fluid communication with the mobile receptacle via the steam output port formed in the sidewall of the receptacle;
    means for angularly adjusting the convex lens to follow the tracked position of the sun,
    whereby the convex lens concentrates ambient light on the volume of fluid stored within the receptacle, heating the fluid and converting the fluid to steam, the means for generating electricity from the steam receiving the steam and generating usable electricity; and
    means for heating the fluid within the receptacle when solar radiation is insufficient to produce the desired levels of power.

2. The solar-based power generator as recited in claim 1, wherein said convex lens has opposed upper and lower surfaces, the upper and lower surfaces each being convex and each of the upper and lower surfaces having a constant radius of curvature, the upper surface of said convex lens spanning an arc of approximately 180° and the lower surface of said convex lens spanning an angle in a range between approximately 30° and 45°.

3. The solar-based power generator as recited in claim 1, wherein the means for heating the fluid within the receptacle includes a mobile generator located within the housing.

4. The solar-based power generator as recited in claim 3, wherein the mobile generator includes a Stirling engine.

5. A solar-based power generator, consisting of:
    a mobile receptacle adapted for receiving, containing and retaining a volume of fluid, the mobile receptacle including a bottom surface and a sidewall having a fluid input port and a steam output port, wherein the steam output port is located at a height offset from and above the fluid input port;
    a housing having an open upper end, said housing being formed from a thermally insulating material and being adapted for receiving the mobile receptacle;
    a convex lens mounted on the open upper end of said housing, above the receptacle when the receptacle is moved within the housing, the lens consists of opposed upper and lower surfaces and a peripheral rim for sealing the open upper end of the housing, the peripheral rim being in sole contact with the upper end of the housing, the lens is configured to focus solar rays directly onto the fluid;
    means for selectively delivering fluid from a source to the receptacle, wherein the fluid delivering means includes an input pipe for delivering the fluid through the fluid input port formed through the sidewall of the receptacle;
    means for generating electricity from steam, wherein the means for generating electricity is in fluid communication with the mobile receptacle via the steam output port formed in the sidewall of the receptacle;
    means for angularly adjusting the convex lens to follow the tracked position of the sun,
    whereby the convex lens concentrates ambient light on the volume of fluid stored within the receptacle, heating the fluid and converting the fluid to steam, the means for generating electricity from the steam receiving the steam and generating usable electricity.

* * * * *